Figure 9:
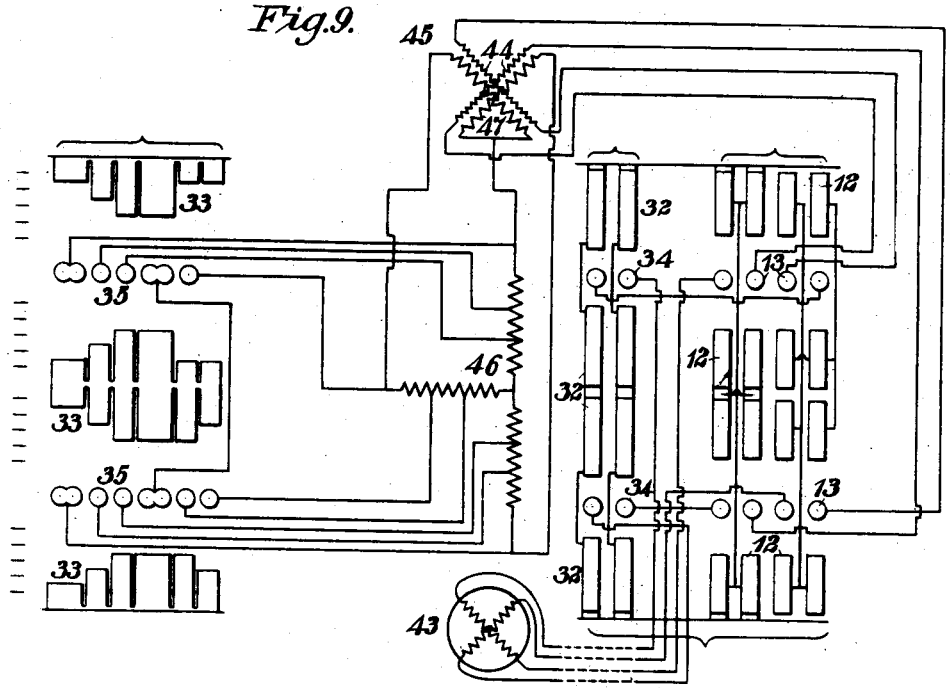

No. 713,678. Patented Nov. 18, 1902.
T. S. PERKINS.
CONTROLLER FOR ELECTRIC MOTORS.
(Application filed Jan. 6, 1902.)
(No Model.) 3 Sheets—Sheet 1.
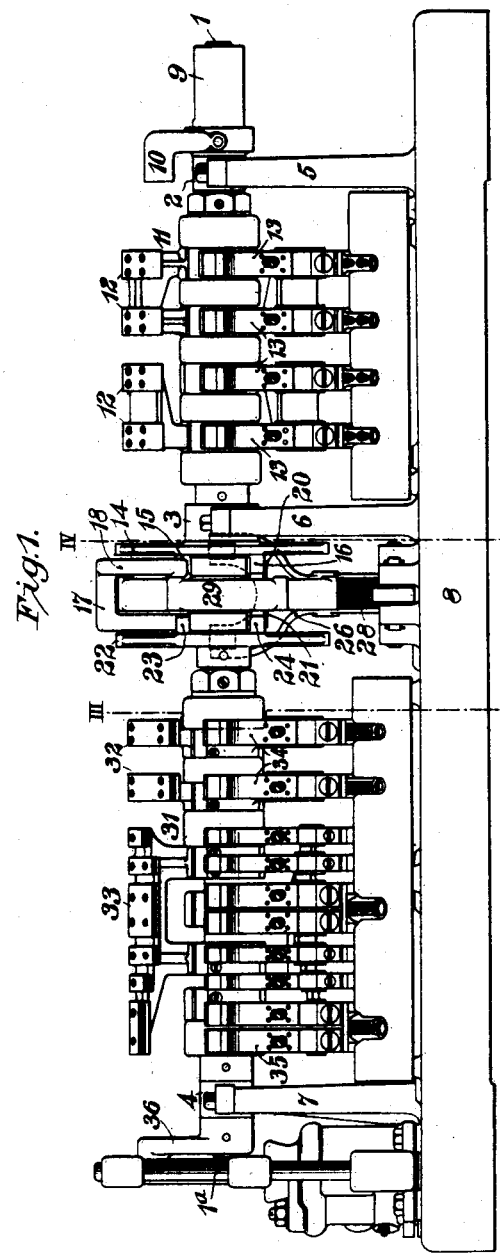
WITNESSES:
C. L. Belcher
Birney Hines
INVENTOR
Thomas S. Perkins
BY
Wesley G. Carr
ATTORNEY.

No. 713,678. Patented Nov. 18, 1902.
T. S. PERKINS.
CONTROLLER FOR ELECTRIC MOTORS.
(Application filed Jan. 6, 1902.)
(No Model.) 3 Sheets—Sheet 2.
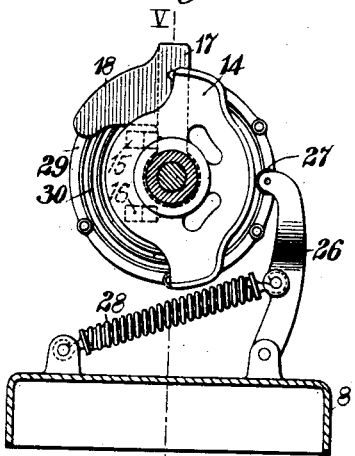
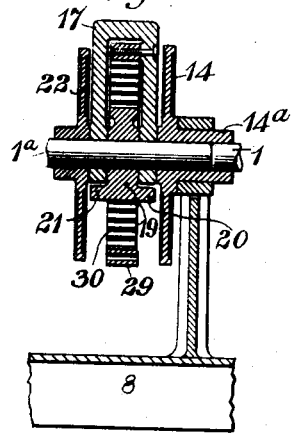
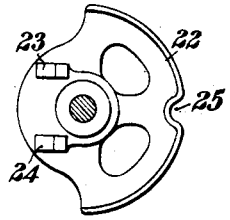
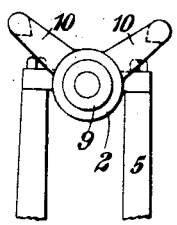
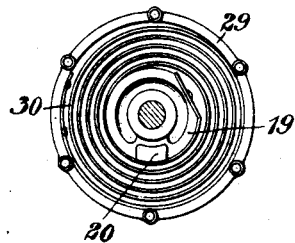
WITNESSES:
C. L. Belcher
Birney Hines
INVENTOR
Thomas S. Perkins
BY
Wesley G. Carr
ATTORNEY.

No. 713,678. Patented Nov. 18, 1902.
T. S. PERKINS.
CONTROLLER FOR ELECTRIC MOTORS.
(Application filed Jan. 6, 1902.)
(No Model.)
3 Sheets—Sheet 3.

WITNESSES:
C. L. Belcher
Birney Hines

INVENTOR
Thomas S. Perkins
BY
Wesley G. Carr
ATTORNEY

UNITED STATES PATENT OFFICE.

THOMAS S. PERKINS, OF IDLEWOOD, PENNSYLVANIA, ASSIGNOR TO WESTINGHOUSE ELECTRIC & MANUFACTURING COMPANY, A CORPORATION OF PENNSYLVANIA.

CONTROLLER FOR ELECTRIC MOTORS.

SPECIFICATION forming part of Letters Patent No. 713,678, dated November 18, 1902.

Application filed January 6, 1902. Serial No. 88,628. (No model.)

*To all whom it may concern:*

Be it known that I, THOMAS S. PERKINS, a citizen of the United States, residing at Idlewood, in the county of Allegheny and State of Pennsylvania, have invented a new and useful Improvement in Controllers for Electric Motors, (Case No. 1,029,) of which the following is a specification.

My invention relates to controllers for electric motors of the type in which the initial movement is produced by hand and subsequent movement and regulation of movement are effected automatically.

The object of my invention is to provide a controller of the character above indicated which shall be comparatively simple in construction and effective in operation and in which the initial application of power by hand shall serve to determine the direction of motion of the motor or motors in connection with which the controller is used and to store up power to be subsequently expended automatically in closing the line-circuit and effecting the desired changes in the motor speed.

My invention is primarily intended for controlling alternating-current induction-motors which are employed for operating elevators; and as specifically worked out it embodies means for determining the direction of rotation of the motor and means for storing up manually-applied power to be subsequently expended in connecting the primary winding of the motor with the source of electrical energy and in progressively short-circuiting external resistance that is normally included in circuit with the secondary winding of the motor in order to secure the desired starting torque.

Certain features of my invention are limited to the use above stated; but as regards certain other features the invention is not restricted to use in connection with any specific type of motor and coöperating apparatus. It will be therefore understood that the description and illustration in so far as they appear to limit the invention to specific structural details and to specific coöperative relations to other mechanisms are so presented for convenience of disclosure and without any intention of thereby restricting the scope of the invention.

The invention is illustrated in the accompanying drawings, in which—

Figure 10:
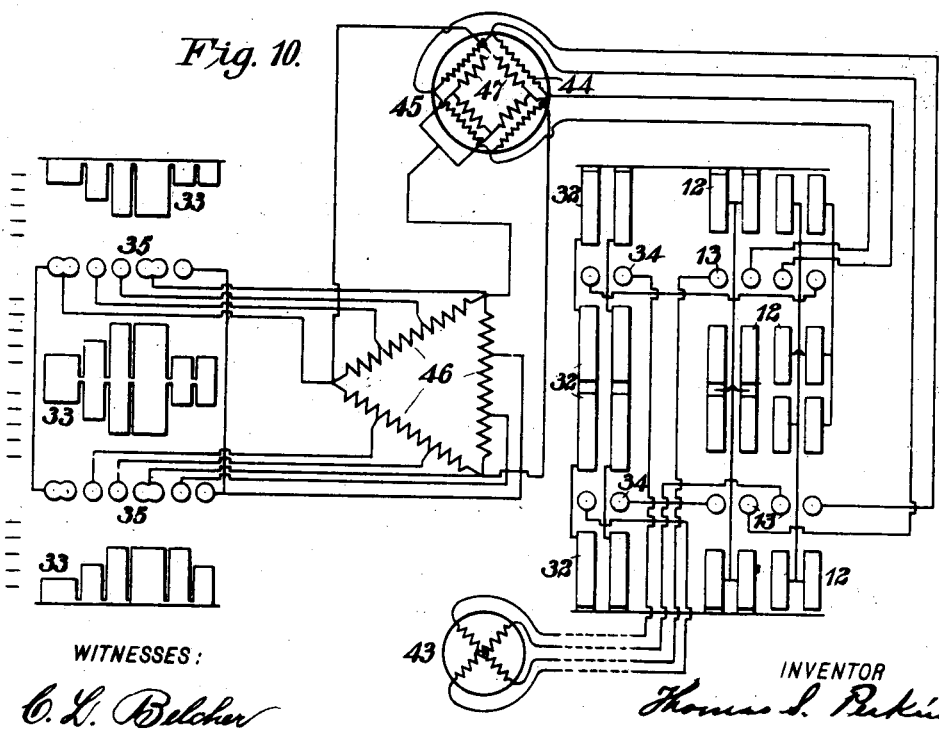

Figure 1 is a side elevation of a controller constructed in accordance with my invention. Fig. 2 is a view, partially in elevation and partially in section, of one end of the controller. Fig. 3 is a vertical section taken on line III III of Fig. 1. Fig. 4 is a vertical section taken on line IV IV of Fig. 1, the controller drum and fingers being, however, omitted. Fig. 5 is a detail sectional view taken on line V V of Fig. 4. Fig. 6 is a detail view of the locking-cam. Fig. 7 is a view of the supporting-standards for one end of the shaft and the stop-arms for the shaft. Fig. 8 is a detail view of the operating-spring and its casing. Fig. 9 is a diagram of the electrical machines, apparatus, and circuits which are employed in practicing my invention. Fig. 10 is a view similar to Fig. 9, but showing a different arrangement of variable resistance.

The controller has two alined shafts 1 and $1^a$, which are provided with three bearings 2, 3, and 4, respectively supported upon three pairs of standards 5, 6, and 7. These standards are mounted upon a base 8, which may have the form of a hollow casting, as indicated, and may contain the resistances which are employed in starting the motor.

Upon the end of the shaft 1 is keyed or otherwise fastened a sleeve 9, to which power may be applied by any suitable means—such, for example, as a wheel and a coöperating cord which extends through the elevator car in position to be operated by the elevator attendant. Any suitable means for manually rotating the shaft 1 may obviously be employed. The sleeve 9 is provided with two arms 10, which are of such form and so located as to engage, respectively, with the end standards 5 as the shaft is turned in the one direction or the other, and thus limit its rotative movement. Between the standards 5 and 6 the shaft is provided with a drum 11, having contact-strips 12, which engage with stationary spring-fingers 13 for the purpose of establishing the circuit connections that determine the direction in which the controlled motor shall operate. The shaft 1 is also provided with a cam 14, having on one side lugs 15 and 16. The hub $14^a$ of the cam 14 is rigidly fastened to the shaft 1 and is located in the bearing-box 3. It also receives the end of shaft 1ª and constitutes a bearing therefor. (See Fig. 5). Loosely mounted upon the shaft 1ª, adjacent to the side of the cam 14, having lugs 15 and 16, is a yoke 17, provided with a laterally-projecting curved arm 18. Within the yoke 17 and also loosely mounted upon the shaft 1ª is a collar 19, having lugs 20 and 21, which project laterally from its respective sides below the shaft. Mounted rigidly upon the shaft 1ª and adjacent to the yoke 17, on the side opposite to that occupied by the cam 14, is a locking-cam 22, having lugs 23 and 24, corresponding to the lugs 15 and 16 on the cam 14 and also provided with a locking-notch 25 in its periphery.

A bifurcated lever 26 is pivoted at its lower end to the base-casting 8, and the upper ends of its arms are provided with rollers 27, which respectively engage with the edges of the cams 14 and 22. These rollers are held in engagement with the edges or working faces of the cams by means of a coiled spring 28.

Within the yoke 17 is mounted a ring or casing 29, to which is riveted one end of a spiral spring 30. The inner end of the spring 30 is riveted or otherwise fastened to the collar 19, as indicated in Fig. 8. The casing or ring 29 is bolted to one of the main arms of the yoke 17 and also to the end of the arm 18, it being provided with four pairs of bolt-holes for this attachment, so that the ring may be adjusted to vary the amount of power stored up in the spring.

Rigidly mounted upon the shaft 1ª is a drum 31, having two sets of contact-strips 32 and 33, with which sets of contact-fingers 34 and 35 make engagement as the drum is rotated. The outer end of the shaft 1ª is provided with a crank-arm 36, having a roller 37, which operates in a cam-slot 38 in a reciprocating head 39, this head being guided by two posts 40. The head 39 is connected to the upper end of the piston-rod 41 of a dash-pot 42.

Referring now particularly to Figs. 9 and 10, the controller is shown as employed for supplying energy from a two-phase generator 43 to the primary winding 44 of a two-phase induction-motor 45 and for adjusting or varying the amount of a variable resistance 46, which is included in circuit with the secondary winding 47 of the motor 45. The only difference between what is shown in these two figures is that the sections of the resistance 46 and the primary and secondary windings of the motor 45 are shown as having star connection in Fig. 9, while in Fig. 10 the motor-windings and the resistance-windings are shown as connected in delta.

In the operation of the controller the shaft 1 is first positively actuated by the attendant either in one direction or the other to bring the contact-strips 12 into engagement with the corresponding fingers 13 and one of the arms 10 into engagement with the corresponding standard 5, thus limiting the movement of the drum. This serves to make such circuit connections as will insure the movement of the motor in the one direction or the other, according to the direction in which the drum is rotated. During the movement of the drum 11 to the point where the strips 12 first engage the fingers 13 the portion of the cam 14 that is concentric with the shaft is in engagement with the corresponding roller 27, carried by the lever 26, and consequently the roller in the other arm of the lever 26 is in the notch 25 of the cam 22, and the said cam and the parts connected therewith are therefore locked in that position, and no rotation of the drum 31 takes place. Further movement of the shaft 1 and the drum 11, however, causes the projecting portions of the cam 14 to move the lever 26 outward, and thus release the cam 22. If the shaft 1 be rotated in a clockwise direction, the lug 15 on the cam 14 will engage the adjacent main arm of the yoke 17, and thus effect movement of the yoke with the shaft. At the same time the lug 24 on the locking-cam 22 will engage the lug 21 on the collar 19, and thus prevent movement of the collar. It follows, therefore, that the inner end of the spring 42 will be held stationary and that its outer end, which is fastened to the casing 41, will be moved to effect winding up of the spring, and thus store power, to be subsequently expended in rotating the drum 31 when the latter is released, as above described.

The action of the dash-pot mechanism in insuring a slow steady movement of the drum 31 will be readily understood without further description.

When the shaft 1 is actuated in a contra-clockwise direction, the lug 16 on the cam 14 will engage the lug 20 on the collar 19, and thus wind the spring, since the ring 29, to which the outer end of the spring is attached, is held against rotation by the engagement of the lug 23 on the locking-cam 22 with the adjacent arm of the yoke 17.

As regards the circuit changes effected by rotation of the drum 31, it is obvious that the direction of rotation of the drum is immaterial, since the construction and arrangement of the contacts is symmetrical. The arrangement of contact-strips on the drum 11 is also symmetrical for both directions of rotation; but the circuit connections between these strips and with the line and the motor are such that the current of one of the phases is reversed when the drum is moved in one direction with reference to what it is when the drum is moved in the other, and consequently the direction of rotation of the motor is correspondingly reversed. This being a well-known expedient and the circuit connections being plainly indicated, an enumeration of the several contact-pieces and tracing of the circuits are deemed unnecessary.

In order to insure automatic cutting out or short-circuiting of the resistance after the motor is started and cutting in of the resistance in stopping, I provide means whereby the line-current is not supplied to the motor until the drum 31 operates, this means being a circuit-closing switch the movable contact members 32 of which are carried by the drum 31, so that the rotation of the drum 11 will merely serve to store up power in the spring 30 and place the reversing-switch in circuit-closing position, so as to determine the direction of rotation of the motor when current is supplied thereto. Upon the release of the drum 31 it will be moved to first bring strips 32 into engagement with fingers 34, since these strips are longer than the strips 33, and thus connect the primary winding of the motor to the line through the switch 34 32 and the reversing-switch 12 13. When the line connection with the primary winding is made, the entire resistance 46 is included in circuit with the secondary winding of the motor. Further movement of the drum 31 serves to first short-circuit one-third of the resistance 46, then two-thirds, and finally when the drum reaches the limit of its movement the entire resistance is short-circuited.

In stopping the motor the drums 11 and 31 will rotate together, and the resistance will be all included in the secondary circuit before the primary circuit is opened by the separation of the strips 32 and fingers 34.

I desire it to be understood that while the details of construction shown and described have been found to be satisfactory, and therefore embody the principles of my invention in the form of apparatus that I have found best adapted to carry it into effect, I do not desire or intend to limit my invention to such specific details, since modifications may obviously be made therein without departing from the spirit and scope of the invention.

I claim as my invention—

1. In a controller, the combination with contact-fingers, of a directly-actuated, reversing-drum, a rheostatic drum and a spring connection between the two drums, whereby the movement of the reversing-drum to circuit-closing position imparts power to the spring connection which is subsequently expended to actuate the rheostatic drum.

2. In a controller, the combination with a manually-actuated reversing-switch and a rheostatic switch, of a spring connection between said switches and means for locking the movable member of the rheostatic switch until the reversing-switch is in circuit-closing position.

3. The combination with an induction, electric motor and a variable resistance, of a switch for cutting said resistance into and out of circuit with the secondary winding of the motor, a reversing-switch between the source of energy and the primary winding of the motor and a spring interposed between the movable members of the two switches which serves to operate the resistance-varying switch after the reversing-switch has been moved in either direction to circuit-closing position.

4. The combination with an induction, electric motor and a variable resistance, of a controller comprising a manually-actuated, reversing-drum, a rheostatic drum, a spring for connecting said drums, a set of fingers which coöperates with the rheostatic drum to cut resistance into and out of the secondary circuit of the motor and two sets of fingers which respectively coöperate with the rheostatic drum and the reversing-drum to make and break connection between the line and the primary winding of the motor and to reverse the direction of movement of the motor.

5. The combination with an electric motor, of a controller comprising a manually-actuated reversing-drum, a rheostatic drum, a lost motion, spring connection between said drums and means for connecting the motor with the source of current through contacts on both of said drums.

6. The combination with an electric motor, of a controller comprising a reversing-switch and a rheostatic switch, a spring connection between the movable members of said switches and means for holding the movable member of the rheostatic switch stationary while the movable member of the reversing-switch is manually moved to circuit-closing position, said switches being connected in series between the source of current and the motor.

7. The combination with an electric motor, of a controller comprising a rheostatic switch having a spring-actuated member, a retarding device and a locking device therefor, and a reversing-switch having a manually-actuated member for first imparting power to the actuating-spring and then releasing the member to be operated by it and means for supplying energy to the motor through the two switches in series.

8. The combination with an induction, electric motor and a variable resistance, of a controller comprising a spring-actuated member, locking and retarding devices therefor, a manually-operated member for imparting power to the actuating-spring and for releasing the member to be actuated by it, contact-fingers coöperating with the spring-actuated member to cut the resistance into and out of the secondary circuit of the motor and contact-fingers coöperating with both movable members of the controller to first determine the direction of movement of the motor and then to connect its primary winding with the source of energy.

In testimony whereof I have hereunto subscribed my name this 17th day of December, 1901.

THOMAS S. PERKINS.

Witnesses:
JAMES B. YOUNG,
WESLEY G. CARR.